Feb. 11, 1930.  C. BODMER  1,746,692
SAW SET
Filed Dec. 17, 1927
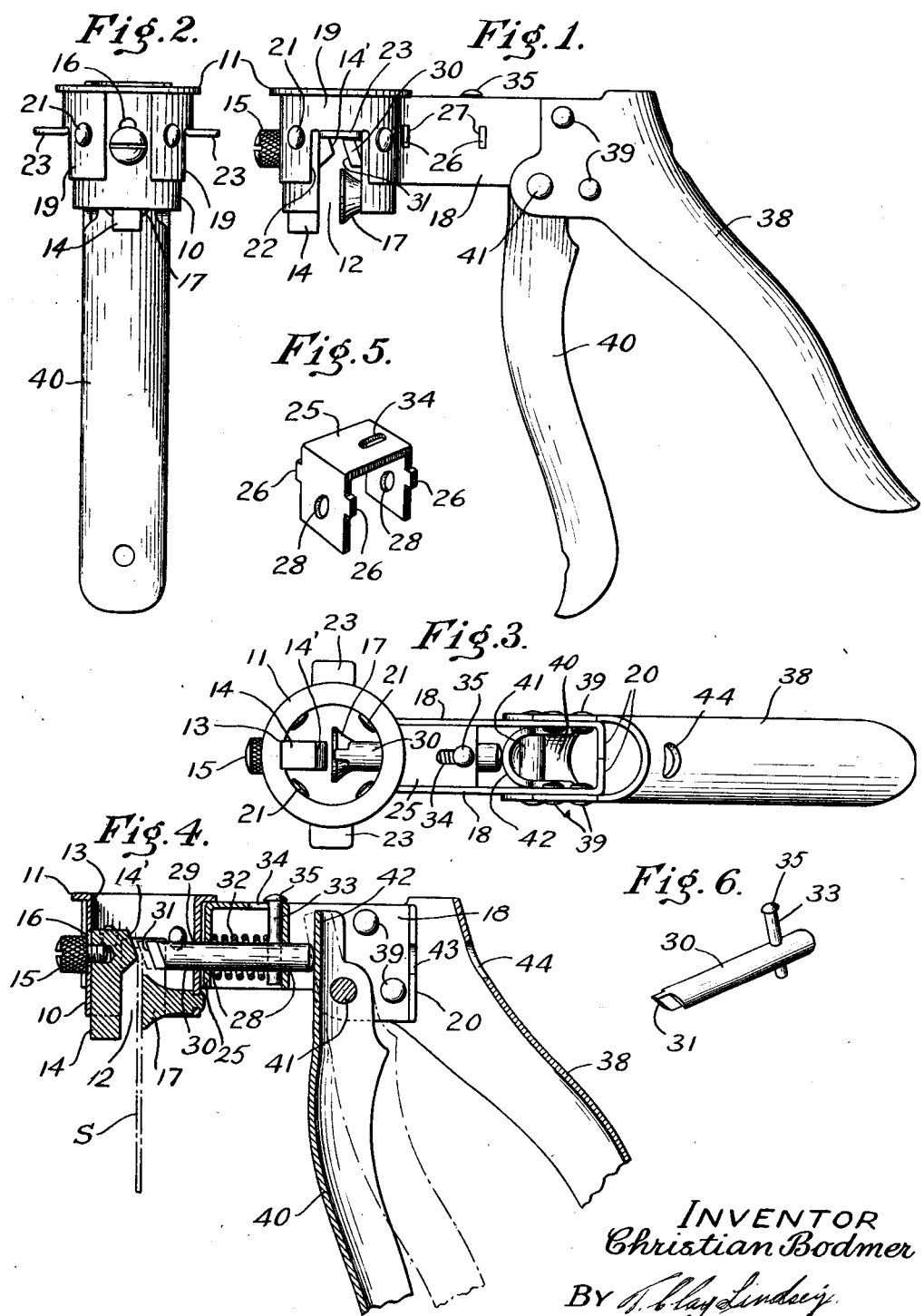
INVENTOR
Christian Bodmer
BY
ATTORNEY.

Patented Feb. 11, 1930

1,746,692

UNITED STATES PATENT OFFICE

CHRISTIAN BODMER, OF NEW BRITAIN, CONNECTICUT, ASSIGNOR TO THE STANLEY WORKS, OF NEW BRITAIN, CONNECTICUT, A CORPORATION OF CONNECTICUT

SAW SET

Application filed December 17, 1927. Serial No. 240,762.

This invention relates to a device for setting the teeth of saws, and has as its aim to provide a device of this sort having various features of novelty and advantage.

More particularly, an aim of the invention is to provide an improved saw set which is characterized by its simplicity in construction, the economy with which it may be manufactured, and its effectiveness and durability.

A further aim of the invention is to provide a saw set which is constructed, for the most part, of sheet or strip metal, the various parts being so arranged and assembled that a very sturdy yet light tool is had at a relatively low cost.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one of the embodiments which the present invention may take:

Figure 1 is a side elevational view of my improved saw set;

Fig. 2 is a front view thereof;

Fig. 3 is a top plan view;

Fig. 4 is a sectional view taken longitudinally and centrally through the tool;

Fig. 5 is a perspective view of a bridge or spacer in which the plunger is adapted to be supported; and Fig. 6 is a perspective view of the plunger.

Referring to the drawing in detail, the numeral 10 designates a member or head which provides a sight opening. This head, in the present instance, is in the form of a tubular or cylindrical member having its upper end flanged as at 11 so as to give a finish and increased strength to the head. The head, at opposite sides and at its lower end, is provided with notches 12 which are adapted to accommodate the saw during the operation of setting the teeth thereof. The head is also provided on its interior wall and at its front end with a key-way 13 in which is mounted, for vertical adjustment, an anvil block 14 having an inclined anvil face 14'. The anvil block is adapted to be adjustably secured in place by means of a screw 15 extending through a slot 16 in the head and threaded into the anvil block. Within and projecting forwardly from the rear lower end of the head is a gauge or stop 17, the forward face of which is vertically disposed.

The head 10 is carried on the forward end of a body or housing which is formed of sheet metal, this housing having a pair of parallel side walls 18, a curved arm or segment 19 at the forward end of each side wall, and a rear or transverse wall 20. The arms 19 are curved similarly to the head 10 and are adapted to receive and closely hug the head. These arms are secured to the head in suitable manner as by means of rivets 21. The arms are notched as at 22 so as to accommodate the saw, and the upper edges of these notches have outwardly extending lugs or ears 23 which are adapted to rest upon the toothed edge of the saw during the operating of the teeth thereof. By preference, the body portion is formed of two pieces of sheet metal which are identical in construction but oppositely disposed. In this instance, the rear ends of the strips are bent over, and these bent over ends abut so as to form the rear wall 20.

Positioned in the space between the side walls 18 of the body portion and immediately behind the head is a bridge or spacer 25 which is formed of sheet metal and which has a generally inverted U shape, as shown in Fig. 5. The spacer is of a width to fit snugly between the side walls of the housing and may be secured in place by means of ears 26 which extend into openings 27 in the side walls. The arms of the bridge are provided with aligned holes 28 which are adapted to register with a hole 29 in the rear wall of the head so as to accommodate a reciprocating plunger 30, the forward end 31 of which is inclined correspondingly to the inclination of the anvil face 14'. The plunger is normally urged into retracted position by a spring 32 coiled about the plunger and positioned between the front wall of the bridge and a pin 33 carried by the plunger. The upper end of this pin extends through a slot 34 in the top wall of the bridge. The upper end of the pin may be headed, as at 35. Thus, the plunger is held for reciprocating movement but against turning about its longitudinal axis.

Fixed to the rear end of the housing is a handle 38 which preferably depends rearwardly and downwardly so that the tool may be held in the hand in the most convenient position. This handle is preferably formed by bending or swaging a strip or blank of steel to the shape illustrated. The upper end of the handle straddles and embraces the rear end of the housing to which it is secured by means of rivets 39. For the purpose of reciprocating the plunger, there is provided a handle or lever 40 also formed of cold rolled strip steel. This lever is pivoted on a pin 41 forwardly of the handle 38. The pin or stud 41, in addition to constituting a pivot for the lever 40, serves as an anchor for tying together the handle and the side walls of the housing through which the stud extends. The lever has an upwardly extending portion 42 which is adapted to bear against the rear end of the plunger. The rear end or wall 20 of the housing has an opening 43, and the handle has an opening 44, these openings being in alignment with the openings 28 and 29 in order to permit assembly of the plunger in the bridge.

The operation of the device is generally similar to that of tools of like character. When the lever 40 is moved to the dotted line position shown in Fig. 4, the plunger is advanced so as to set the saw tooth between the plunger and the anvil face 14' at the proper angle against the anvil face 14'. The saw is shown diagrammatically in Fig. 4 and is designated by the letter S.

From the foregoing description, taken in connection with the accompanying drawing, it will be seen that my improved tool is made, for the most part, of sheet or strip metal. The parts are so shaped and tied together that an extremely sturdy and durable tool is obtained. At the same time, the tool is relatively light and may be manufactured at a relatively low cost.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a saw set, a tubular head forming a sight opening, an anvil in said head, a housing having a pair of spaced side walls and curved arms at the forward ends of said walls straddling and secured to said head, a bridge between and carried by the side walls of said housing for supporting a plunger, a plunger mounted for reciprocation therein and opposed to said anvil, a handle connected to the rear end of said housing, and a lever pivoted in said housing for reciprocating said plunger.

2. In a saw set, an annular head forming a sight opening, an anvil in said head; a strip metal housing having a pair of spaced side walls, arms at the forward ends of said walls curved correspondingly to and receiving said head, and a rear wall; means for securing said head between said arms; a bridge between and carried by the side walls of said housing for supporting a plunger, a plunger mounted in said bridge and extending through said head and registering with said anvil, a handle straddling the rear end of and secured to said housing, and a lever pivoted to said housing forwardly of said handle for reciprocating said plunger.

3. In a saw set, a tubular head forming a sight opening and having an annular flange at its upper end and saw receiving notches in its lower edge, an anvil in said head; a sheet metal housing having a pair of spaced parallel side walls, a rear wall, and arms at the forward ends of the side walls conforming to and receiving between them said head; a bridge between said side walls, a plunger mounted for reciprocation in said bridge and registering with said anvil, a sheet metal handle embracing and secured to the rear end of said housing, and a cooperating lever pivoted in said housing for reciprocating said plunger.

4. In a saw set of sheet stock, a member forming a sight opening with an anvil therein, a two-part housing attached to said member, a bridge between the side walls of said housing, a plunger mounted for reciprocation in said bridge, a spring in said bridge normally retracting said plunger, a handle attached to the rear end of said housing, and a lever pivoted in the housing forwardly of the handle for reciprocating said plunger.

5. In a saw set of sheet stock, an annular flanged head forming a sight opening, an anvil and a stop in said head, a two-part housing attached to said head, a bridge between the side walls of said housing, a plunger mounted for reciprocation in said bridge, a spring in said bridge cooperating with said plunger, a handle straddling and secured to the rear end of said housing and securing the parts thereof together, and a lever pivoted in said housing forwardly of said handle for reciprocating said plunger.

6. In a saw set of sheet stock, a flanged tubular head forming a sight opening, an anvil and a stop therein; a two-part housing, each part comprising a side wall, an arm at the forward end of the side wall secured to the head, and a rear end bent inwardly, the rear bent ends of said parts abutting together; a bridge located between the side walls of said housing, a plunger in said bridge, a spring in said bridge, a positioning pin carried by said plunger, a handle secured to the rear end of said housing, and a lever pivoted between the side walls of said housing forwardly of said handle for reciprocating said plunger.

7. In a saw set, an annular head having a slide-away, an anvil adjustably mounted in said slide-away, a stop opposite said anvil, a housing comprising two sections attached at their forward ends to said head and extending rearwardly therefrom and having their rear ends turned inwardly and abutting, a bridge between the side walls of said housing, a plunger mounted centrally in said bridge, a spring for retracting said plunger, a positioning pin carried by said plunger, a handle attached at the rear end of said housing, and a lever pivoted to said housing for reciprocating said plunger.

8. In a saw set of sheet stock, a tubular head provided with a key-way, an anvil adjustable in said key-way; a housing comprising two sections, each section having a side wall, a curved arm at the forward end thereof, and an inwardly bent portion at its rear end, the rear ends of said sections abutting; said head and said arms having saw receiving notches and outwardly extending wings at the upper edges of said notches, a sheet metal bridge positioned between and carried by said side walls of said housing, a plunger mounted for reciprocation in said bridge, a spring in said bridge about said housing, a positioning pin carried by said plunger, said bridge having a slot in which said pin operates, a handle straddling and secured to the rear end of said housing, and a lever pivoted in said housing for reciprocating said plunger.

CHRISTIAN BODMER.